US012117752B2

(12) United States Patent
Inagaki et al.

(10) Patent No.: US 12,117,752 B2
(45) Date of Patent: Oct. 15, 2024

(54) RESIN BELT FOR IMAGE FORMING APPARATUS, FIXING BELT, FIXING DEVICE, AND IMAGE FORMING APPARATUS

(71) Applicant: FUJIFILM Business Innovation Corp., Tokyo (JP)

(72) Inventors: Tomotake Inagaki, Kanagawa (JP); Ryohei Yoshikawa, Kanagawa (JP); Kenji Kajiwara, Kanagawa (JP); Yasuhiko Kinuta, Kanagawa (JP); Hitoshi Komuro, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/178,688

(22) Filed: Mar. 6, 2023

(65) Prior Publication Data

US 2024/0019799 A1 Jan. 18, 2024

(30) Foreign Application Priority Data

Jul. 12, 2022 (JP) ................................. 2022-111997

(51) Int. Cl.
*G03G 15/20* (2006.01)
*G03G 15/16* (2006.01)

(52) U.S. Cl.
CPC ....... *G03G 15/2057* (2013.01); *G03G 15/162* (2013.01); *G03G 15/2064* (2013.01); *G03G 2215/1623* (2013.01); *G03G 2215/2048* (2013.01); *G03G 2215/2054* (2013.01)

(58) Field of Classification Search
CPC ........... G03G 15/2053; G03G 15/2057; G03G 2215/2016; G03G 2215/2048; G03G 2215/2054; G03G 15/206; G03G 2215/2009; G03G 15/162; B65G 2812/02198; B29D 29/06; F16G 1/06; F16G 1/14; F16G 1/21; F16G 1/26; Y10T 428/254; Y10T 428/269; Y10T 428/31721
USPC ........................... 399/329; 474/264; 198/957
See application file for complete search history.

(56) References Cited

U.S. PATENT DOCUMENTS

| | | | | |
|---|---|---|---|---|
| 2013/0202333 A1* | 8/2013 | Sugimoto | G03G 15/2057 399/329 |
| 2014/0127513 A1* | 5/2014 | Nakajima | B28B 11/048 264/312 |
| 2014/0178110 A1* | 6/2014 | Yagi | G03G 15/162 399/302 |
| 2016/0061300 A1* | 3/2016 | Aoto | G03G 15/2017 399/288 |
| 2020/0356029 A1* | 11/2020 | Takei | G03G 15/162 |
| 2021/0301050 A1* | 9/2021 | Ohara | B65G 15/14 |
| 2022/0179344 A1* | 6/2022 | Lee | C08G 73/1071 |
| 2022/0342353 A1* | 10/2022 | Kobayashi | C09D 5/4461 |

FOREIGN PATENT DOCUMENTS

| | | | | |
|---|---|---|---|---|
| CN | 105652619 A * | 6/2016 | G03G 15/0233 |
| CN | 107118515 A * | 9/2017 | B32B 15/092 |
| JP | 2020003667 A * | 1/2020 | B32B 1/08 |
| JP | 2021063868 A * | 4/2021 | |

* cited by examiner

*Primary Examiner* — Robert B Beatty
(74) *Attorney, Agent, or Firm* — Sughrue Mion, PLLC

(57) ABSTRACT

A resin belt for an image forming apparatus includes a resin base layer containing a filler. The exposed area of the filler on an inner circumferential surface side of the resin base layer is 0.1% or less.

15 Claims, 4 Drawing Sheets

RESIN BELT FOR IMAGE FORMING APPARATUS, FIXING BELT, FIXING DEVICE, AND IMAGE FORMING APPARATUS

CROSS-REFERENCE TO RELATED APPLICATIONS

This application is based on and claims priority under 35 USC 119 from Japanese Patent Application No. 2022-111997 filed Jul. 12, 2022.

BACKGROUND

(i) Technical Field

The present disclosure relates to a resin belt for an image forming apparatus, a fixing belt, a fixing device, and an image forming apparatus.

(ii) Related Art

Japanese Unexamined Patent Application Publication No. 2021-063868 discloses "a fixing belt including at least a cylindrical base formed of a metal, a first coating film formed on the inner circumferential surface side of the cylindrical base and made of a heat resistant resin, and a second coating film formed on the inner circumferential surface side of the first coating film and made of a heat resistant resin, wherein the second coating film has a sliding surface that comes into sliding contact with a backup member that abuts against the inner side of the second coating film, wherein the surface roughness on the inner side of the second coating film is smaller than the surface roughness on the inner side when only the first coating film is formed, and wherein a filler is added to at least the first coating film."

SUMMARY

Aspects of non-limiting embodiments of the present disclosure relate to a resin belt for an image forming apparatus that includes a resin base layer containing a filler. With this resin belt for an image forming apparatus, wear of a member in contact with the inner circumferential surface side of the resin belt when the resin belt is driven is smaller than that when the exposed area of the filler on the inner circumferential surface side of the resin base layer is more than 0.1%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin belt for an image forming apparatus, the resin belt including a resin base layer containing a filler, wherein an exposed area of the filler on an inner circumferential surface side of the resin base layer is 0.1% or less.

BRIEF DESCRIPTION OF THE DRAWINGS

Exemplary embodiments of the present disclosure will be described in detail based on the following figures, wherein.

DETAILED DESCRIPTION

Figure 1:
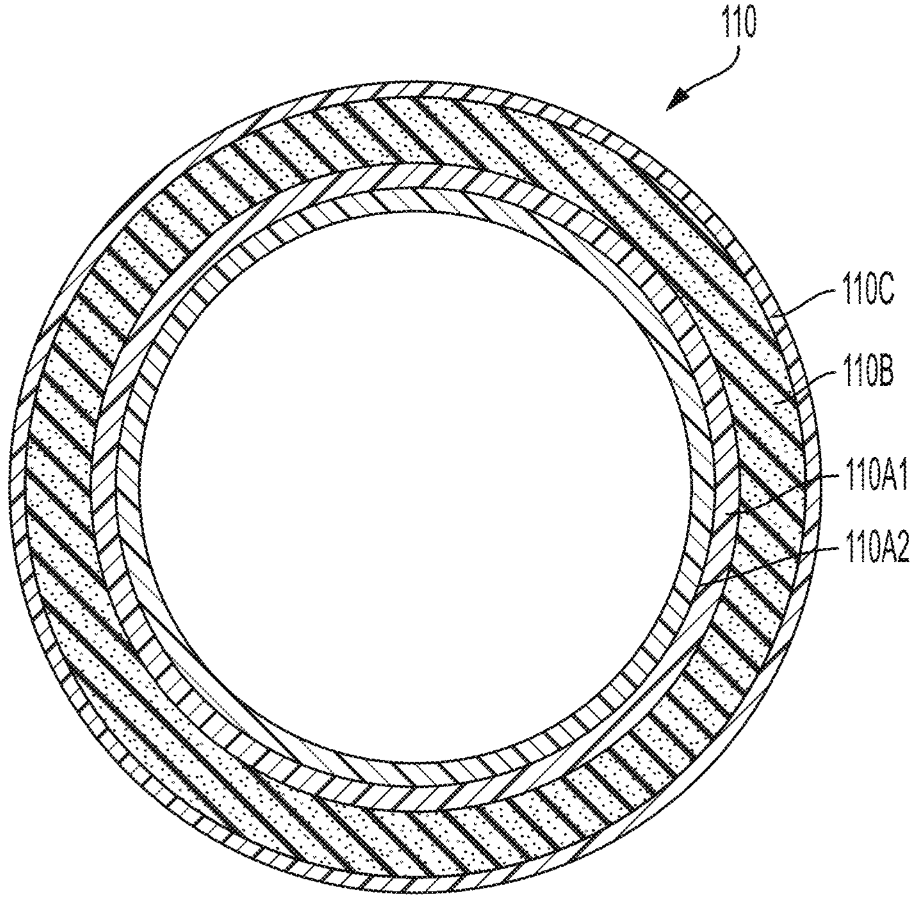
FIG. 1 is a schematic cross-sectional view showing an example of a fixing belt according to an exemplary embodiment.

Exemplary embodiments of the present disclosure will be described below. The following description and Examples are illustrative of the exemplary embodiments and are not intended to limit the scope of the present disclosure.

In a set of numerical ranges expressed in a stepwise manner in the present specification, the upper or lower limit in one numerical range may be replaced with the upper or lower limit in another numerical range in the set of numerical ranges. Moreover, in a numerical range described in the present specification, the upper or lower limit in the numerical range may be replaced with a value indicated in an Example.

Any component may contain a plurality of materials corresponding to the component.

When reference is made to the amount of a component in a composition, if the composition contains a plurality of materials corresponding to the component, the amount means the total amount of the plurality of materials in the composition, unless otherwise specified.

<Resin Belt for Image Forming Apparatus>

A resin belt for an image forming apparatus according to a first exemplary embodiment includes a resin base layer containing a filler, and the exposed area of the filler on the inner circumferential surface side of the resin base layer is 0.1% or less.

The resin belt for an image forming apparatus according to the first exemplary embodiment has the above structure and can therefore reduce the wear of a member in contact with the inner circumferential surface of the resin belt when the resin belt is driven. The reason for this may be as follows.

For the purpose of improving the thermal conductivity of a resin belt for an image forming apparatus, the resin belt contains a filler in some cases. In these cases, the filler is occasionally exposed at the inner circumferential surface of the resin belt for an image forming apparatus. When the amount of the filler exposed at the inner circumferential surface is large, a member in contact with the inner circumferential surface of the resin belt for an image forming apparatus can easily wear when the resin belt is driven.

The resin belt for an image forming apparatus according to the first exemplary embodiment includes the resin base layer containing the filler, and the exposed area of the filler on the inner circumferential surface side of the resin base layer is 0.1% or less. Even in the resin belt for an image forming apparatus that contains the filler, the amount of the filler exposed at the inner circumferential surface is small when the exposed area of the filler on the inner circumferential surface side of the resin base layer is 0.1% or less.

Therefore, with the resin belt for an image forming apparatus according to the first exemplary embodiment, the wear of the member in contact with the inner circumferential surface of the resin belt when the resin belt is driven may be reduced.

A resin belt for an image forming apparatus according to a second exemplary embodiment includes a resin base layer containing a filler, and the resin base layer includes a first resin layer in which the content of the filler is from 3% by mass to 30% by mass inclusive and a second resin layer in which the content of the filler is from 0% by mass to 0.1% by mass inclusive.

The content of the filler in the first resin layer is the ratio of the mass of the filler contained in the first resin layer with respect to the total mass of the first resin layer.

The content of the filler in the second resin layer is the ratio of the mass of the filler contained in the second resin layer with respect to the total mass of the second resin layer.

The resin belt for an image forming apparatus according to the second exemplary embodiment has the above structure and can therefore reduce the wear of a member in contact with the inner circumferential surface of the resin belt when the resin belt is driven. The reason for this may be as follows.

When the content of the filler in the second resin layer is from 0% by mass to 0.1% by mass inclusive, the content of the filler in the second resin layer is small. Therefore, the amount of the filler exposed at the inner circumferential surface of the resin belt for an image forming apparatus is small.

When the content of the filler in the first resin layer is from 3% by mass to 30% by mass inclusive, the thermal conductivity of the resin belt for an image forming apparatus is maintained.

Therefore, with the resin belt for an image forming apparatus according to the second exemplary embodiment, the wear of the member in contact with the inner circumferential surface of the resin belt when the resin belt is driven may be reduced.

A resin belt for an image forming apparatus that corresponds to both the first and second exemplary embodiments will be described in detail. However, it is only necessary that an example of the resin belt for an image forming apparatus of the present disclosure be a resin belt corresponding to any one of the first and second exemplary embodiments.

(Resin Base Layer)

The resin base layer will be described in detail.

The resin base layer is a layer forming the inner circumferential surface of the resin belt for an image forming apparatus.

The "inner circumferential surface" is the inner surface of the resin belt for an image forming apparatus when the resin belt is formed into an endless shape (tubule shape).

—Filler—

The resin base layer contains the filler.

The aspect ratio of the filler is preferably 3 or more, more preferably from 3 to 5000 inclusive, and still more preferably from 3 to 3000 inclusive.

When the aspect ratio of the filler is 3 or more, the bending resistance of the resin belt for an image forming apparatus may be improved. The reason that the bending resistance is improved may be that the degree of stress concentration on the interface between the filler and the resin during bending can be reduced.

When the aspect ratio of the filler is 3 or more, the surface roughness of the inner circumferential surface tends to increase when the filler is exposed at the inner circumferential surface of the belt. However, in the resin belt for an image forming apparatus according to the present exemplary embodiment, even when the aspect ratio of the filler is 3 or more, the amount of the filler exposed at the inner circumferential surface is small, so that the surface roughness of the inner circumferential surface is small. Therefore, with the resin belt for an image forming apparatus, the wear of the member in contact with the inner circumferential surface of the resin belt when the resin belt is driven is small.

The aspect ratio of the filler is computed using the following procedure.

The belt used for the measurement is cut in its thickness direction using a microtome, and the obtained section of the belt is observed under an electron microscope to take a photograph at a magnification of 1000×. One hundred filler particles are selected in the photograph taken. Then the minor axis of each filler particle (the length of a line segment that is orthogonal to the major axis and contained in the outline of the filler particle) and its major axis (the maximum length of a line segment connecting two points on the outline of the filler particle) are measured. The arithmetic mean value of the measured minor axis values and the arithmetic mean value of the measured major axis values are determined, and the aspect ratio is computed by dividing the arithmetic mean value of the major axis values by the arithmetic mean value of the minor axis values (the arithmetic mean value of the major axis values/the arithmetic mean value of the minor axis values).

From the viewpoint of improving the thermal conductivity of the resin belt for an image forming apparatus, the thermal conductivity of the filler may be 500 W/mK or more.

No particular limitation is imposed on the filler, but the filler may be fibrous carbon.

The "fibrous carbon" is a material containing carbon atoms as a main component (the content of the carbon atoms in the material is 80% by mass or more) and having an aspect ratio of 2 or more.

The filler may be carbon nanotubes.

When carbon nanotubes are used as the filler, the bending resistance of the resin belt for an image forming apparatus can be more easily improved. This may be because of the high mechanical strength of the carbon nanotubes that has an influence on the bending resistance.

The content of the filler is preferably from 10% by mass to 40% by mass inclusive, more preferably from 15% by mass to 35% by mass inclusive, and still more preferably from 20% by mass to 30% by mass inclusive based on the total mass of the resin base layer.

—Resin—

The resin base layer contains a resin.

No particular limitation is imposed on the resin, and any resin suitable for the application of the belt may be selected.

The resin contained in the exemplary embodiment may be a heat resistant resin.

Examples of the resin include polyimides, aromatic polyamides, liquid crystal materials such as thermotropic liquid crystal polymers, and highly heat resistant and high strength resins. In addition to these materials, polyesters, polyethylene terephthalates, polyether sulfones, polyether ketones, polysulfones, polyimide amides, etc. may be used.

In particular, the resin may be a polyimide.

Examples of the polyimide include imidized products of polyamic acids (precursors of polyimide resins) that are polymers of tetracarboxylic dianhydrides and diamine compounds. A specific example of the polyimide is a resin obtained by subjecting equimolar amounts of a tetracarboxylic dianhydride and a diamine compound to a polymerization reaction in a solvent to obtain a polyamide acid solution and subjecting the polyamide acid solution to imidization.

The tetracarboxylic dianhydride may be an aromatic compound or an aliphatic compound. From the viewpoint of heat resistance, the tetracarboxylic dianhydride may be an aromatic compound.

Examples of the aromatic tetracarboxylic dianhydride include pyromellitic dianhydride, 3,3',4,4'-benzophenonetetrac arboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, 2,3,3',4'-biphenyltetracarboxylic dianhydride, bis(phthalic acid) phenylphosphine oxide dianhydride, p-phenylene-bis(triphenylphthalic) dianhydride, m-phenylene-bis(triphenylphthalic) dianhydride, bis(triphenylphthalic acid)-4,4'-diphenyl ether dianhydride, and bis(triphenylphthalic acid)-4,4'-diphenylmethane dianhydride.

Examples of the aliphatic tetracarboxylic dianhydride include: aliphatic and alicyclic tetracarboxylic dianhydrides such as butanetetracarboxylic dianhydride, 1,2,3,4-cyclobutanetetrac arboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetrac arboxylic dianhydride, 5-(2,5-dioxotetrahydrofuryl)-3-methyl-3-cyclohexene-1,2-dicarboxylic dianhydride, and bicyclo[2,2,2]-oct-7-ene-2,3,5,6-tetracarboxylic dianhydride; and aliphatic tetracarboxylic dianhydrides having an aromatic ring such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

In particular, the tetracarboxylic dianhydride is preferably an aromatic tetracarboxylic dianhydride. Specifically, the tetracarboxylic dianhydride is more preferably, for example, pyromellitic dianhydride, 3,3',4,4'-biphenyltetracarboxylic dianhydride, 2,3,3',4'-biphenyltetracarboxylic dianhydride, 3,3',4,4'-biphenylethertetracarboxylic dianhydride, or 3,3',4,4'-benzophenonetetracarboxylic dianhydride, still more preferably pyromellitic dianhydride, 3,3',4,4'-biphenyltetracarboxylic dianhydride, or 3,3',4,4'-benzophenonetetracarboxylic dianhydride, and particularly preferably 3,3',4,4'-biphenyltetracarboxylic dianhydride.

One of these tetracarboxylic dianhydrides may be used alone, or two or more of them may be used in combination.

When two or more tetracarboxylic dianhydrides are used in combination, a combination of aromatic tetracarboxylic dianhydrides or a combination of aliphatic tetracarboxylic dianhydrides may be used, or a combination of an aromatic tetracarboxylic dianhydride and an aliphatic tetracarboxylic dianhydride may be used.

The diamine compound used has two amino groups in its molecular structure. Examples of the diamine compound include aromatic diamine compounds and aliphatic diamine compounds. The diamine compound may be an aromatic compound.

Examples of the diamine compound include: aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindan, 6-amino-1-(4'-aminophenyl)-1,3,3-trimethylindan, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl) hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenyleneisopropylidene) bisaniline, 4,4'-(m-phenyleneisopropylidene)bisaniline, 2,2'-bis[4-(4-amino-2-trifluoromethylphenoxy)phenyl] hexafluoropropane, and 4,4'-bis[4-(4-amino-2-trifluoromethyl)phenoxy]-octafluorobiphenyl; aromatic diamines having two amino groups bonded to an aromatic ring and having a heteroatom other than the nitrogen atoms in the amino groups such as diaminotetraphenylthiophene; and aliphatic diamines and alicyclic diamines such as 1,1-m-xylylenediamine, 1,3-prop anediamine, tetramethylenediamine, pentamethylenediamine, octamethylenediamine, nonamethylenediamine, 4,4-diaminoheptamethylenediamine, 1,4-diaminoc yclohexane, isophoronediamine, tetrahydrodicyclopentadienylenediamine, hexahydro-4,7-methanoindanylenedimethylenediamine, tricyclo[6,2,1,$0^{2,7}$]-undecylenedimethyldiamine, and 4,4'-methylenebis (cyclohexylamine).

In particular, the diamine compound is preferably an aromatic diamine compound. Specifically, for example, the diamine compound is more preferably p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, or 4,4'-diaminodiphenylsulfone and particularly preferably 4,4'-diaminodiphenyl ether or p-phenylenediamine.

One of these diamine compounds may be used alone, or two or more of them may be used in combination.

When two or more diamine compounds are used in combination, a combination of aromatic diamine compounds or a combination of aliphatic diamine combination may be used, or a combination of an aromatic diamine compound and an aliphatic diamine compound may be used.

In particular, from the viewpoint of heat resistance, the polyimide is preferably an aromatic polyimide (specifically, an imidized product of a polyamic acid (a precursor of a polyimide resin) that is a polymer of an aromatic tetracarboxylic dianhydride and an aromatic diamine compound).

The aromatic polyimide is more preferably a polyimide having a structural unit represented by general formula (PI1).

(PI1)

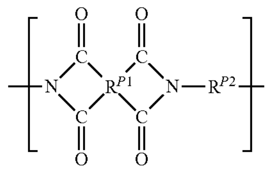

In general formula (PI1), $R^{P1}$ represents a phenyl group or a biphenyl group, and $R^{P2}$ represents a divalent aromatic group.

Examples of the divalent aromatic group represented by $R^{P2}$ include a phenylene group, a naphthyl group, a biphenyl group, and a diphenyl ether group. From the viewpoint of bending resistance, the divalent aromatic group may be a phenylene group or a biphenyl group.

The number average molecular weight of the polyimide is preferably from 5,000 to 100,000 inclusive, more preferably from 7,000 to 50,000 inclusive, and still more preferably from 10,000 to 30,000 inclusive.

The number average molecular weight of the polyimide is measured by gel permeation chromatography (GPC) under the following conditions.

Column: TOSOH TSKgel α-M (7.8 mm I.D.×30 cm)

Eluent: DMF (dimethylformamide)/30 mM LiBr/60 mM phosphoric acid

Flow rate: 0.6 mL/min

Injection amount: 60 μL

Detector: RI (refractive index detector)

The content of the resin is preferably 70% by mass or more, more preferably 80% by mass or more, still more preferably 85% by mass or more, and particularly preferably 90% by mass or more based on the total mass of the resin base layer.

—Additives—

The resin base layer may contain, in addition to the filler and the resin, well-known additives such as a lubricant.

—First Resin Layer and Second Resin Layer—

The resin base layer may include a first resin layer and a second resin layer.

In the first resin layer, the content of the filler is from 3% by mass to 30% by mass inclusive.

In the second resin layer, the content of the filler is from 0% by mass to 0.1% by mass inclusive.

The content of the filler in the first resin layer is the amount of the filler contained in the first resin layer with respect to the total mass of the first resin layer.

The content of the filler in the second resin layer is the amount of the filler contained in the second resin layer with respect to the total mass of the second resin layer.

The second resin layer is a layer present at the inner circumferential surface of the resin belt for an image forming apparatus.

The first resin layer is a layer in contact with the second resin layer and present on the outer circumferential surface side of the resin belt for an image forming apparatus.

Since the content of the filler in the second resin layer is small, the amount of the filler exposed at the inner circumferential surface of the resin belt for an image forming apparatus is small, and the surface roughness of the inner circumferential surface is small. In this case, the wear of the member in contact with the inner circumferential surface of the resin belt when the resin belt is driven is reduced.

Since the first resin layer is included, the thermal conductivity of the resin belt for an image forming apparatus is maintained.

From the viewpoint of the thermal conductivity of the resin belt for an image forming apparatus, the content of the filler in the first resin layer is preferably from 3% by mass to 30% by mass inclusive, more preferably from 5% by mass to 30% by mass inclusive, and still more preferably from 6% by mass to 30% by mass inclusive based on the total mass of the first resin layer.

From the viewpoint of reducing the wear of the member in contact with the inner circumferential surface of the resin belt for an image forming apparatus, the content of the filler in the second resin layer is preferably from 0% by mass to 0.1% by mass inclusive, more preferably from 0% by mass to 0.08% by mass inclusive, and still more preferably from 0% by mass to 0.05% by mass inclusive based on the total mass of the second resin layer.

Particularly preferably, the second resin layer contains no filler (i.e., particularly preferably, the content of the filler in the second resin layer is 0% by mass based on the total mass of the second resin layer).

When the second resin layer contains no filler, the amount of the filler exposed at the inner circumferential surface of the resin belt for an image forming apparatus is further reduced, and the surface roughness of the inner circumferential surface is further reduced. In this case, the wear of the member in contact with the inner circumferential surface of the resin belt when the resin belt is driven is further reduced.

The thickness of the second resin layer may be 15% or less, or may be 10% or less of the thickness of the resin base layer.

When the thickness of the second resin layer is 10% or less of the thickness of the resin base layer, the thermal conductivity of the resin belt for an image forming apparatus can be more easily improved while the wear of the member in contact with the inner circumferential surface of the resin belt is reduced.

Since the content of the filler in the second resin layer is small, the thermal conductivity of the second resin layer tends to be small. However, by setting the thickness ratio of the second resin layer within the above range, a reduction in the thermal conductivity of the belt as a whole can be prevented. Since the second resin layer is provided, the wear of the member in contact with the inner circumferential surface of the resin belt for an image forming apparatus is reduced.

The thickness of the resin base layer and the thickness of the second resin layer are measured as follows.

The belt used for the measurement is cut in its thickness direction using a microtome, and the obtained section of the belt is observed under an electron microscope to take a photograph at a desired magnification.

The photograph is observed, and the thickness of the resin base layer is measured at three points. Then the arithmetic mean of the measured thickness values is computed. The photograph is observed, and the thickness of the second resin layer is measured at three points. Then the arithmetic mean of the measured thickness values is computed.

The thickness of the resin base layer is preferably from 50 μm to 200 μm inclusive, more preferably from 60 μm to 150 μm inclusive, and still more preferably from 70 μm to 100 μm inclusive.

(Properties of Resin Belt for Image Forming Apparatus)

—Exposed Area of Filler on Inner Circumferential Surface Side of Resin Base Layer—

In the resin belt for an image forming apparatus according to the present exemplary embodiment, the exposed area of the filler on the inner circumferential surface side of the resin base layer is 0.1% or less.

From the viewpoint of reducing the wear of the member in contact with the inner circumferential surface of the resin belt for an image forming apparatus, the exposed area of the filler on the inner circumferential surface side of the resin base layer is preferably 0.05% or less, more preferably 0.03% or less, still more preferably 0%.

The exposed area of the filler on the inner circumferential surface side of the resin base layer is computed using the following procedure.

The inner circumferential surface of the belt used for the measurement is observed under a scanning electron microscope (SEM), and a photograph is taken at a magnification of 1000×. The total area of portions at which the filler is exposed (white portions originating from the filler) in the photograph taken is computed. Then the percentage of the area of the portions at which the filler is exposed is determined with the area of the photograph set to 100, and the value determined is used as the exposed area of the filler on the inner circumferential surface side of the resin base layer.

—Thermal Conductivity—

The thermal conductivity of the resin belt for an image forming apparatus according to the present exemplary embodiment is preferably 0.8 W/mK or more, more preferably 1.0 W/mK or more, and still more preferably 1.1 W/mK or more.

In the resin belt for an image forming apparatus according to the present exemplary embodiment, since the exposed area of the filler on the inner circumferential surface is low, the thermal conductivity tends to be low. Therefore, the thermal conductivity of the resin belt for an image forming apparatus is set to be 0.8 W/mK or more to improve the thermal conductivity of the belt as a whole.

The thermal conductivity of the belt is measured as follows.

A flat plate-shaped test piece is cut from the belt for the measurement, and the thermal diffusivity of the test piece in its thickness direction is used to determine the thermal conductivity. Specifically, the test piece is placed on a probe of a thermal conductivity measurement device ai-Phase Mobile (manufactured by ai-Phase Co., Ltd.), and a weight of 50 gf is placed on the test piece. Then the thermal conductivity is measured three times in a manual mode under the conditions of 1.41 V and a measurement time of 2 seconds in ten divisions in the range of 3 Hz to 100 Hz. The arithmetic mean of the three measured values is used as the thermal conductivity of the belt.

—Surface Roughness Ra on Inner Circumferential Surface Side of Resin Base Layer—

In the resin belt for an image forming apparatus according to the present exemplary embodiment, the surface roughness Ra on the inner circumferential surface side of the resin base layer is preferably from 0.2 μm to 1.5 μm inclusive, more preferably from 0.3 μm to 1.5 μm inclusive, and still more preferably from 0.5 μm to 1.2 μm inclusive.

When the surface roughness Ra on the inner circumferential surface side of the resin base layer is 1.5 μm or less, the pressure applied to protruding portions of the resin belt for an image forming apparatus is small. Therefore, when the resin belt for an image forming apparatus is driven, the member in contact with the inner circumferential surface of the resin resists wear.

If the surface roughness Ra on the inner circumferential surface side of the resin base layer of the resin belt for an image forming apparatus is excessively small, the friction between the inner circumferential surface of the belt and the member in contact with the belt tends to be excessively large when the resin belt is driven. In this case, the member in contact with the inner circumferential surface of the resin belt for an image forming apparatus is easily worn.

Therefore, the surface roughness Ra on the inner circumferential surface side of the resin base layer is set to be 0.2 μm or more. In this case, the inner circumferential surface of the resin belt for an image forming apparatus has an appropriate surface roughness Ra, and the friction between the inner circumferential surface of the belt and the member in contact therewith is reduced.

(Shape of Resin Belt for Image Forming Apparatus)

For example, from the viewpoint of increasing the flexibility in selecting the application of the resin belt for an image forming apparatus according to the present exemplary embodiment and from the viewpoint of increasing the bending resistance, the resin belt may be an endless belt (which is referred to also as a seamless belt). The endless belt is a belt with its opposite ends jointed together so as to have no seam.

(Method for Producing Resin Belt for Image Forming Apparatus)

The resin belt for an image forming apparatus according to the present exemplary embodiment is produced by the following method.

Specifically, the resin belt for an image forming apparatus according to the present exemplary embodiment is produced through the step of preparing a coating solution containing components forming the belt (coating solution preparing step) and the step of applying the obtained coating solution to a cylindrical base and drying the coating solution. The coating solution contains the filler, the resin, optional additives, etc.

When the resin is a polyimide, the resin belt for an image forming apparatus according to the present exemplary embodiment is obtained by preparing a coating solution containing the filler, a polyamic acid (the precursor of the polyimide resin), optional additives, etc., applying the obtained coating solution to the cylindrical base, and firing (i.e., imidizing) the coating solution.

The method for producing the resin belt for an image forming apparatus according to the present exemplary embodiment will be described in more detail.

(Coating Solution Preparing Step)

In the coating solution preparing step, first, the filler, the resin, and a dispersion medium may be mixed to prepare the coating solution.

The dispersion medium is, for example, an organic solvent that does not dissolve the filler or dissolves only a small amount of the filler and can dissolve the resin. When, for example, the resin used is a polyamic acid (a precursor of a polyimide resin), the dispersion medium may be N-methyl-2-pyrrolidone (NMP), dimethyl sulfoxide (DMSO), etc.

In the coating solution preparing step, two coating solutions with different filler contents may be prepared.

Specifically, a coating solution A having a smaller filler content than a coating solution B described later or containing no filler and the coating solution B having a larger filler content than the coating solution A may be prepared.

The content of the resin in the coating solution A is preferable about 1% by mass to about 20% by mass inclusive (more preferably from 3% by mass to 18% by mass inclusive) based on the total mass of the coating solution A.

The content of the filler in the coating solution B may be, for example, from 0.1% by mass to 10% by mass inclusive based on the total mass of the coating solution B.

The content of the resin in the coating solution B is preferably from 1% by mass to 20% by mass inclusive (more preferably from 3% by mass to 18% by mass inclusive) based on the total mass of the coating solution B.

(Belt Forming Step)

The belt forming step may be performed according to a procedure including the following (1) to (3).

(1) The coating solution A is applied to the cylindrical base and dried to form a coating film A.

(2) The coating solution B is applied to the coating film A and dried to form a coating film B.

(3) The coating film A and the coating film B are fired.

It is only necessary that the drying temperature in (1) and (2) above be a temperature at which volatilization of the dispersion medium contained in each coating solution is facilitated, and the drying temperature may be appropriately controlled according to the boiling point of the dispersion medium contained in the coating solution. For example, when the dispersion medium used is N-methyl-2-pyrrolidone (NMP), the drying temperature in (1) and (2) above may be from 160° C. to 200° C. inclusive.

The firing temperature in (3) above may be higher than the drying temperature in (1) and (2). When the coating solutions contain a polyamic acid, the firing temperature in (3) may be, for example, a temperature at which imidization proceeds. When the coating solutions contain a polyamic acid, the firing temperature in (3) may be, for example, from 300° C. to 400° C. inclusive.

In the above-described method for producing the resin belt for an image forming apparatus, the two coating solutions having different filler contents are prepared and applied to produce the resin belt having a two-layer structure. However, the method for producing the resin belt for an image forming apparatus according to the present exemplary embodiment is not limited to the above method.

For example, a coating solution containing no filler but containing the resin and the dispersion medium may be prepared. Then, while the prepared coating solution is applied to the cylindrical base, the filler may be added to the coating solution to gradually increase the content of the filler in the coating solution, and the resulting coating solution may be applied to the cylindrical base. Then the coating film obtained by applying the coating solution using the above method may be dried and fired to thereby produce a resin belt for an image forming apparatus.

(Application of Resin Belt for Image Forming Apparatus)

Examples of the application of the resin belt for an image forming apparatus according to the present exemplary embodiment include a fixing belt and a cooling belt.

<Fixing Belt>

A fixing belt according to the present exemplary embodiment includes the resin belt for an image forming apparatus according to the present exemplary embodiment and further includes an elastic layer and a surface layer that are disposed successively on the belt.

Specifically, the fixing belt according to the present exemplary embodiment includes the above-described resin belt for an image forming apparatus according to the present exemplary embodiment that serves as a base layer and further includes the elastic layer and the surface layer that are disposed successively on the base layer.

The fixing belt according to the present exemplary embodiment will be described with reference to FIG. 1.

FIG. 1 is a schematic cross-sectional view showing an example of the fixing belt according to the present exemplary embodiment.

The fixing belt 110 shown in FIG. 1 includes a base layer including a first resin layer 110A1 and a second resin layer 110A2, an elastic layer 110B disposed on the base layer, and a surface layer 110C disposed on the elastic layer 110B.

The layer structure of the fixing belt 110 according to the present exemplary embodiment is not limited to the layer structure shown in FIG. 1, and a layer structure including a bonding layer interposed between the base layer and the elastic layer 110B or a layer structure including a bonding layer interposed between the elastic layer 110B and the surface layer 110C may be used.

Components of the fixing belt according to the present exemplary embodiment will be described in detail. In the following description, reference symbols will be omitted.

(Base Layer)

In the fixing belt according to the present exemplary embodiment, the resin belt for an image forming apparatus according to the present exemplary embodiment is used as the base layer.

From the viewpoint of thermal conductivity, bending resistance, etc., the thickness of the base layer in the fixing belt according to the present exemplary embodiment is preferably from 20 μm to 200 μm inclusive, more preferably from 30 μm to 150 μm inclusive, and particularly preferably from 40 μm to 120 μm inclusive.

To from the base layer, the above-described method for producing the resin belt for an image forming apparatus according to the present exemplary embodiment may be used.

(Elastic Layer)

The fixing belt according to the present exemplary embodiment includes the elastic layer on the base layer (i.e., the belt according to the present exemplary embodiment).

No particular limitation is imposed on the elastic layer so long as it is a layer having elasticity.

The elastic layer is disposed in order to impart elasticity against pressure applied to the fixing belt from the outer circumferential side and follows irregularities of a toner image on a recording medium to allow the surface of the fixing belt to adhere to the toner image.

The elastic layer may be formed of an elastic material that can restore its original shape even when deformed by the application of an external force of, for example, 100 Pa.

Examples of the elastic material used for the elastic layer include fluorocarbon resins, silicone resins, silicone rubbers, fluorocarbon rubbers, and fluorosilicone rubbers. From the viewpoint of heat resistance, thermal conductivity, and insulating properties, the material of the elastic layer is preferably a silicone rubber or a fluorocarbon rubber and more preferably a silicone rubber.

Examples of the silicone rubber include RTV silicone rubbers, HTV silicone rubbers, and liquid silicone rubbers, and specific examples include polydimethyl silicone rubber (MQ), methylvinyl silicone rubber (VMQ), methylphenyl silicone rubber (PMQ), and fluorosilicone rubber (FVMQ).

The silicone rubber may have an addition reaction-type crosslinking form. The silicone rubber is known to have various types of functional groups and is preferably dimethyl silicone rubber having methyl groups, methylphenyl silicone rubber having methyl groups and phenyl groups, vinyl silicone rubber having vinyl groups (vinyl group-containing silicone rubber), etc.

The silicone rubber is more preferably vinyl silicone rubber having vinyl groups and still more preferably a silicone rubber having an organopolysiloxane structure having a vinyl group and a hydrogen organopolysiloxane structure having a hydrogen atom bonded to a silicon atom (SiH).

Examples of the fluorocarbon rubber include vinylidene fluoride-based rubbers, tetrafluoroethylene/propylene-based rubbers, tetrafluoroethylene/perfluoromethyl vinyl ether rubbers, phosphazene-based rubbers, and fluoropolyethers.

Preferably, the elastic material used for the elastic layer contains the silicone rubber as a main component (the silicone rubber is contained in an amount of 50% by mass or more based on the total mass of the elastic material).

The content of the silicone rubber is more preferably 90% by mass or more and still more preferably 99% by mass or more and may be 100% by mass based on the total mass of the elastic material used for the elastic layer.

The elastic layer may contain, in addition to the elastic material, an inorganic filler for the purpose of reinforcement, heat resistance, thermal conduction, etc. The inorganic filler may be any well-known filler, and examples thereof include fumed silica, crystalline silica, iron oxide, alumina, and metallic silicon.

Other examples of the material of the inorganic filler include well-known inorganic fillers such as carbides (e.g., carbon black, carbon fibers, and carbon nanotubes), titanium oxide, silicon carbide, talc, mica, kaolin, calcium carbonate, calcium silicate, magnesium oxide, graphite, silicon nitride, boron nitride, cerium oxide, and magnesium carbonate.

Of these, silicon nitride, silicon carbide, graphite, boron nitride, and carbides may be used from the viewpoint of thermal conductivity.

The content of the inorganic filler in the elastic layer may be determined based on the required thermal conductivity, the required mechanical strength, etc. and is, for example, from 1% by mass to 20% by mass inclusive, preferably from 3% by mass to 15% by mass inclusive, and more preferably from 5% by mass to 10% by mass inclusive.

The elastic layer may contain additives such as a softener (e.g., a paraffin-based softener), a processing aid (e.g., stearic acid), an antioxidant (e.g., an amine-based antioxidant), and a vulcanizing agent (e.g., sulfur, a metal oxide, or a peroxide).

The thickness of the elastic layer is, for example, preferably from 30 μm to 600 μm inclusive and more preferably from 100 μm to 500 μm inclusive.

To form the elastic layer, any known method may be used. For example, an application method is used.

When the elastic material used for the elastic layer is a silicone rubber, for example, a coating solution for forming the elastic layer that contains a liquid silicone rubber that is cured when heated to form the silicone rubber is prepared. Next, the coating solution for forming the elastic layer is applied to a base layer to form a coating film, and the coating film is optionally vulcanized to form the elastic layer on the base layer. In the vulcanization of the coating film, the vulcanization temperature is, for example, from 150° C. to 250° C. inclusive, and the vulcanization time is, for example, from 30 minutes to 120 minutes inclusive.

(Surface Layer)

The fixing belt according to the present exemplary embodiment includes the surface layer on the elastic layer.

The surface layer plays a role in preventing a toner image in a molten state during fixing from sticking to a surface (outer circumferential surface) that is to come into contact with a recording medium.

The surface layer is required to have, for example, heat resistance and releasability. From this point of view, the material used to form the surface layer may be a heat resistant release material, and specific examples thereof include fluorocarbon rubbers, fluorocarbon resins, silicone resins, and polyimide resins.

In particular, the heat resistant release material may be a fluorocarbon resin.

Specific examples of the fluorocarbon resin include tetrafluoroethylene-perfluoroalkyl vinyl ether copolymers (PFA), polytetrafluoroethylene (PTFE), tetrafluoroethylene-hexafluoropropylene copolymers (FEP), polyethylene-tetrafluoroethylene copolymers (ETFE), polyvinylidene fluoride (PVDF), polychlorotrifluoroethylene (PCTFE), and vinyl fluoride (PVF).

The surface of the surface layer that is on the elastic layer side may be subjected to surface treatment. The surface treatment may be wet treatment or dry treatment, and examples include liquid ammonia treatment, excimer laser treatment, and plasma treatment.

The thickness of the surface layer is preferably from 10 μm to 100 μm inclusive and more preferably from 20 μm to 50 μm inclusive.

To form the surface layer, any known method may be used, and an application method, for example, may be used.

Alternatively, a tubular surface layer may be prepared in advance and fitted over the outer circumference of the elastic layer to thereby form the surface layer. An adhesive layer (e.g., an adhesive layer containing a silane coupling agent having an epoxy group) may be formed on the inner surface of the tubular surface layer and then fitted over the outer circumference.

The thickness of the fixing belt according to the present exemplary embodiment is, for example, preferably from 0.06 mm to 0.90 mm inclusive, more preferably from 0.08 mm to 0.70 mm inclusive, and still more preferably from 0.10 mm to 0.60 mm inclusive.

<Fixing Device>

A fixing device according to the present exemplary embodiment may have any of various structures. A fixing device in one example includes a first rotatable member and a second rotatable member disposed in contact with the outer surface of the first rotatable member, and a recording medium with a toner image formed on its surface is inserted into a contact portion between the first rotatable member and the second rotatable member to fix the toner image. The fixing belt according to the present exemplary embodiment is applied to at least one of the first rotatable member and the second rotatable member.

First and second exemplary embodiments of the fixing device according to the present exemplary embodiment will next be described. The first exemplary embodiment of the fixing device includes a heating roller and a pressing belt, and the second exemplary embodiment of the fixing device includes a heating belt and a pressing roller. In the first and second exemplary embodiments, the fixing belt according to the present exemplary embodiment is applicable to both the heating belt and the pressing belt.

The fixing device according to the present exemplary embodiment is not limited to the first and second exemplary embodiments and may be a fixing device including a heating belt and a pressing belt. In this case, the fixing belt according to the present exemplary embodiment is applicable to both the heating belt and the pressing belt.

(First Exemplary Embodiment of Fixing Device)

Figure 2:
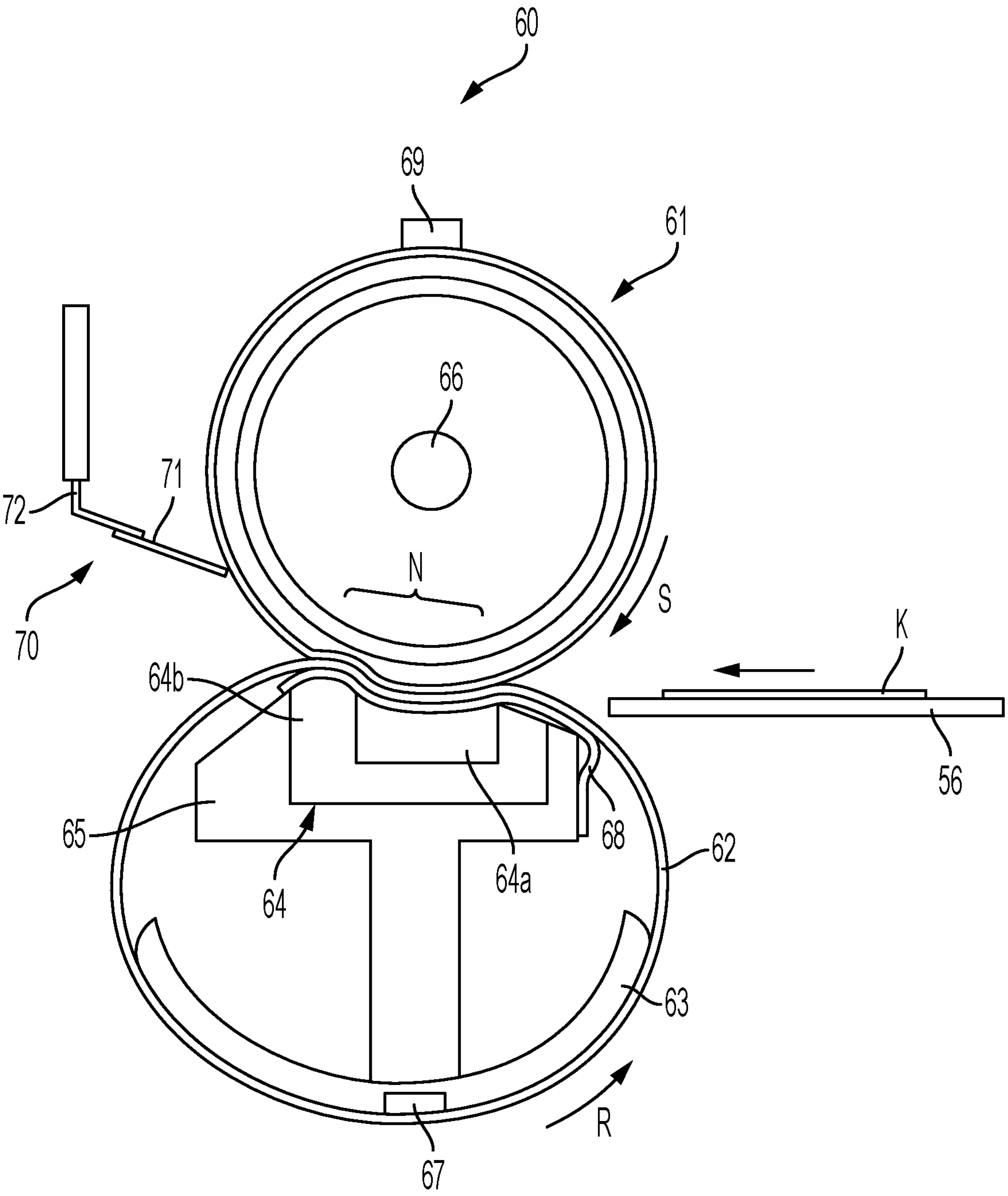
FIG. 2 is a schematic illustration showing an example of a first exemplary embodiment of a fixing device according to the present exemplary embodiment.

The first exemplary embodiment of the fixing device will be described with reference to FIG. 2. FIG. 2 is a schematic illustration showing an example of the first exemplary embodiment of the fixing device (i.e., a fixing device 60).

As shown in FIG. 2, the fixing device 60 includes, for example, a heating roller 61 (an example of the first rotatable member) driven to rotate, a pressing belt 62 (an example of the second rotatable member), and a pressing pad 64 (an example of a pressing member) that presses the heating roller 61 through the pressing belt 62.

It is only necessary that the pressing pad 64 be disposed such that, for example, the pressing belt 62 and the heating roller 61 are pressed against each other. Therefore, the pressing belt 62 may be pressed against the heating roller 61, or the heating roller 61 may be pressed against the pressing belt 62.

A halogen lamp 66 (an example of a heating device) is disposed inside the heating roller 61. The heating device is not limited to the halogen lamp, and any other heat-generating member that generates heat may be used.

For example, a temperature sensing element 69 is disposed in contact with a surface of the heating roller 61. The halogen lamp 66 is turned on or off based on the temperature value measured by the temperature sensing element 69, and the surface temperature of the heating roller 61 is thereby maintained at a target temperature (e.g., 150° C.).

The pressing belt 62 is rotatably supported, for example, by the pressing pad 64 and a belt-running guide 63 that are disposed on the inner side of the pressing belt 62. The pressing belt 62 is disposed so as to be pressed against the heating roller 61 by the pressing pad 64 at a nip part N.

For example, the pressing pad 64 is disposed so as to be pressed against the heating roller 61 through the pressing belt 62 on the inner side of the pressing belt 62, and the nip part N is formed between the pressing pad 64 and the heating roller 61.

The pressing pad 64 includes, for example: a front nipping member 64*a* disposed on the entrance side of the nip part N to provide the large-width nip part N; and a release nipping member 64*b* disposed on the exit side of the nip part N to distort the heating roller 61.

To reduce the sliding resistance between the inner circumferential surface of the pressing belt 62 and the pressing pad 64, a sheet-shaped sliding member 68, for example, is disposed on surfaces of the front nipping member 64*a* and the release nipping member 64*b* that are in contact with the pressing belt 62. The pressing pad 64 and the sliding member 68 are held by a metallic holding member 65.

For example, the sliding member 68 is disposed such that its sliding surface is in contact with the inner circumferential surface of the pressing belt 62 and participates in supply and maintenance of oil between the sliding member 68 and the pressing belt 62.

For example, the belt-running guide 63 is attached to the holding member 65 to allow the pressing belt 62 to rotate.

A lubricant supply device 67 that is a device for supplying a lubricant (e.g., an oil) to the inner circumferential surface of the pressing belt 62 may be attached to the belt-running guide 63.

The heating roller 61 is rotated in the direction of an arrow S by, for example, an unillustrated driving motor, and the pressing belt 62 is driven by the rotation of the heating roller 61 and rotates in the direction of an arrow R that is opposite to the rotation direction of the heating roller 61. Specifically, for example, the heating roller 61 rotates in the clockwise direction in FIG. 2, and the pressing belt 62 rotates in the counterclockwise direction.

A paper sheet K (an example of the recording medium) with an unfixed toner image thereon is guided by, for example, a fixation entrance guide 56 and transported to the nip part N. When the paper sheet K passes through the nip part N, the unfixed toner image on the paper sheet K is fixed by pressure and heat applied to the nip part N.

In the fixing device 60, for example, the front nipping member 64*a* having a concave shape conforming to the outer circumferential surface of the heating roller 61 allows the nip part N to have a larger area than that without the front nipping member 64*a*.

In the fixing device 60, for example, the release nipping member 64*b* is disposed so as to protrude toward the outer circumferential surface of the heating roller 61, so that the distortion of the heating roller 61 increases locally in an exit region of the nip part N.

When the release nipping member 64*b* is disposed as described above, the paper sheet K subjected to fixation passes through the portion with large local distortion during passage through a release nipping region, and therefore the paper sheet K is easily released from the heating roller 61.

For example, a release member 70 used as an auxiliary release unit is disposed downstream of the nip part N of the heating roller 61. The release member 70 is held, for example, by a holding member 72 such that a release claw 71 extending in a direction (counter direction) opposite to the rotation direction of the heating roller 61 is disposed close to the heating roller 61.

(Second Exemplary Embodiment of Fixing Device)

Figure 3:
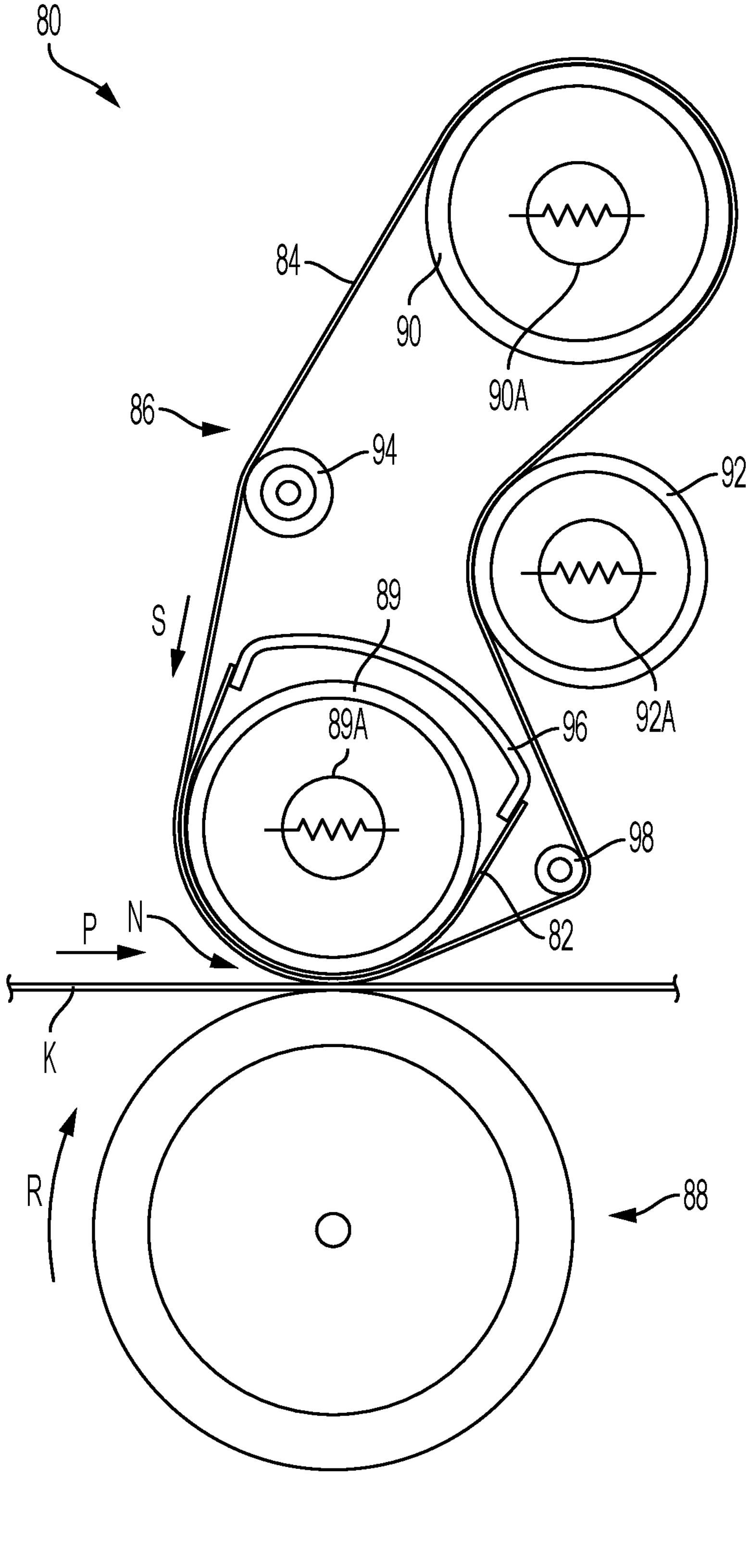
FIG. 3 is a schematic illustration showing an example of a second exemplary embodiment of the fixing device according to the present exemplary embodiment.

The second exemplary embodiment of the fixing device will be described with reference to FIG. 3. FIG. 3 is a schematic illustration showing an example of the second exemplary embodiment of the fixing device (i.e., a fixing device 80).

As shown in FIG. 3, the fixing device 80 includes, for example: a fixing belt module 86 including a heating belt 84 (an example of the first rotatable member); and a pressing roller 88 (an example of the second rotatable member) pressed against the heating belt 84 (the fixing belt module 86). For example, a nip part N is formed at a contact portion between the heating belt 84 (the fixing belt module 86) and the pressing roller 88. In the nip part N, a paper sheet K (an example of the recording medium) is pressurized and heated, and a toner image is thereby fixed.

The fixing belt module 86 includes, for example: the endless heating belt 84; a heat-pressing roller 89 which is disposed on the side toward the pressing roller 88, around which the heating belt 84 is wound, and which is driven to rotate by the rotating force of a motor (not shown) and presses the inner circumferential surface of the heating belt 84 toward the pressing roller 88; and a support roller 90 that supports the heating belt 84 from its inner side at a position different from the heat-pressing roller 89.

The fixing belt module 86 further includes, for example: a support roller 92 that is disposed on the outer side of the heating belt 84 and determines a circulating path of the heating belt 84; a trajectory correction roller 94 that corrects the trajectory of the heating belt 84 in a region between the heat-pressing roller 89 and the support roller 90; and a support roller 98 that applies tension to the heating belt 84 from its inner circumferential surface at a position downstream of the nip part N formed by the heating belt 84 and the pressing roller 88.

For example, the fixing belt module 86 is disposed such that a sheet-shaped sliding member 82 is disposed between the heating belt 84 and the heat-pressing roller 89.

For example, the sliding member 82 is disposed such that its sliding surface is in contact with the inner circumferential surface of the heating belt 84 and participates in supply and maintenance of oil present between the sliding member 82 and the heating belt 84.

For example, the sliding member 82 is disposed such that its opposite ends are supported by a support member 96.

For example, a halogen heater 89A (an example of the heating device) is disposed inside the heat-pressing roller 89.

The support roller 90 is, for example, a cylindrical roller made of aluminum, and a halogen heater 90A (an example of the heating device) is disposed thereinside to heat the heating belt 84 from its inner circumferential surface side.

For example, spring members (not shown) that press the heating belt 84 outward are disposed at opposite ends of the support roller 90.

The support roller 92 is, for example, a cylindrical roller made of aluminum, and a release layer made of a fluorocarbon resin and having a thickness of 20 μm is formed on a surface of the support roller 92.

For example, the release layer on the support roller 92 is formed in order to prevent toner and paper powder on the outer circumferential surface of the heating belt 84 from being deposited on the support roller 92.

For example, a halogen heater 92A (an example of the heating device) is disposed inside the support roller 92 and heats the heating belt 84 from its outer circumferential side.

Specifically, for example, the heating belt 84 is heated by the heat-pressing roller 89, the support roller 90, and the support roller 92.

The trajectory correction roller 94 is, for example, a cylindrical roller made of aluminum, and an edge position measuring mechanism (not shown) that measures an edge position of the heating belt 84 is disposed near the trajectory correction roller 94.

For example, an axial position changing mechanism (not shown) that changes the axial contact position of the heating belt 84 according to the results of measurement by the edge position measuring mechanism is disposed in the trajectory correction roller 94, and meandering of the heating belt 84 is thereby controlled.

For example, the pressing roller 88 is rotatably supported and is pressed by an urging unit such as an unillustrated spring against a portion of the heating belt 84 that is wound around the heat-pressing roller 89. Therefore, as the heating belt 84 (the heat-pressing roller 89) of the fixing belt module 86 rotates and moves in the direction of an arrow S, the pressing roller 88 driven by the heating belt 84 (the heat-pressing roller 89) rotates and moves in the direction of an arrow R.

A paper sheet K with an unfixed toner image (not shown) placed thereon is transported in the direction of an arrow P and guided to the nip part N of the fixing device 80. When the paper sheet K passes through the nip part N, the unfixed toner image on the paper sheet K is fixed by pressure and heat applied to the nip part N.

In the description of the fixing device 80, the halogen heaters (halogen lamps) are used as examples of the plurality of heating devices, but this is not a limitation. Heating elements other than the halogen heaters may be used. Examples of such heating elements include radiation lamp heating elements (heating elements that emit radiation such as infrared radiation) and resistance heating elements (heating elements in which an electric current is applied to a resistor to generate Joule heat: e.g., a heating element prepared by forming a film with resistance on a ceramic substrate and then firing the resulting substrate).

Image Forming Apparatus

Next, an image forming apparatus according to the present exemplary embodiment will be described.

The image forming apparatus according to the present exemplary embodiment includes: image holding members; charging devices that charge the surfaces of the respective image holding members; electrostatic latent image forming devices that form electrostatic latent images on the charged surfaces of the respective image holding members; developing devices that develop the electrostatic latent images formed on the surfaces of the image holding members with respective developers containing toners; transferring devices that transfer the toner images onto a surface of a recording medium; and a fixing device that fixes the toner images onto the recording medium.

The fixing device according to the present exemplary embodiment is used for the above fixing device.

In the image forming apparatus according to the present exemplary embodiment, the fixing device may be a cartridge detachable from the image forming apparatus. Specifically, the image forming apparatus according to the present exemplary embodiment may include the fixing device according to the present exemplary embodiment as a component of a process cartridge.

The image forming apparatus according to the present exemplary embodiment will be described with reference to FIG. 4.

Figure 4:
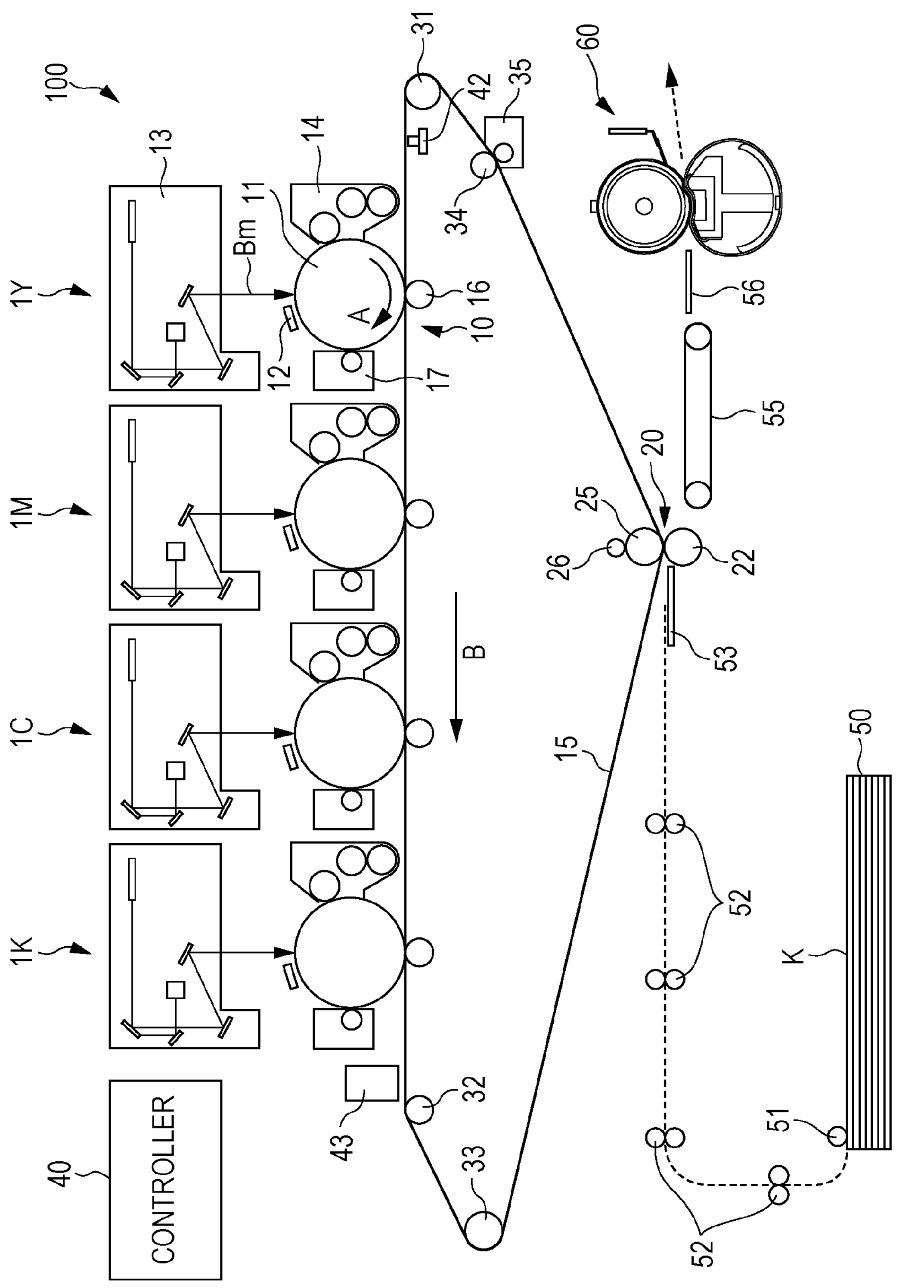
FIG. 4 is a schematic illustration showing an example of an image forming apparatus according to the present exemplary embodiment.

FIG. 4 is a schematic illustration showing the structure of the image forming apparatus according to the present exemplary embodiment.

As shown in FIG. 4, the image forming apparatus 100 according to the present exemplary embodiment is, for example, an intermediate transfer type image forming apparatus having a so-called tandem configuration and includes: a plurality of image forming units 1Y, 1M, 1C, and 1K that form toner images of respective colors by an electrophotographic process; first transfer units 10 that transfer (first-transfer) the color toner images formed by the image forming units 1Y, 1M, 1C, and 1K sequentially onto an intermediate transfer belt 15; a second transfer unit 20 that transfers (second-transfers) all the superposed toner images transferred onto the intermediate transfer belt 15 at once onto a paper sheet K used as a recording medium; and the fixing device 60 that fixes the second-transferred images onto the paper sheet K. The image forming apparatus 100 further includes a controller 40 that controls the operation of each device (each unit).

The fixing device 60 is the first exemplary embodiment of the fixing device described above. The image forming apparatus 100 may include the second exemplary embodiment of the fixing device described above.

Each of the image forming units 1Y, 1M, 1C, and 1K of the image forming apparatus 100 includes a photoreceptor 11 that rotates in the direction of an arrow A and serves as an example of the image holding members each of which holds a toner image formed on its surface.

A charging unit 12 that charges the photoreceptor 11 and serves as an example of the charging device is disposed near the circumference of the photoreceptor 11. A laser exposure unit 13 serving as an example of the latent image forming device and used to write an electrostatic latent image on the photoreceptor 11 is disposed above the photoreceptor 11 (in FIG. 4, an exposure beam is denoted by symbol Bm).

A developing unit 14 that serves as an example of the developing device, contains a color toner, and visualizes the electrostatic latent image on the photoreceptor 11 with the toner is disposed near the circumference of the photoreceptor 11, and a first transfer roller 16 that transfers the color toner image formed on the photoreceptor 11 onto the intermediate transfer belt 15 in a corresponding first transfer unit 10 is disposed near the circumference of the photoreceptor 11.

A photoreceptor cleaner 17 that removes the toner remaining on the photoreceptor 11 is disposed near the circumference of the photoreceptor 11. These electrophotographic devices including the charging unit 12, the laser exposure unit 13, the developing unit 14, the first transfer roller 16, and the photoreceptor cleaner 17 are sequentially arranged in the rotation direction of the photoreceptor 11. The image forming units 1Y, 1M, 1C, and 1K are arranged substantially linearly in the order of yellow (Y), magenta (M), cyan (C), and black (K) from the upstream side of the intermediate transfer belt 15.

The intermediate transfer belt 15 serving as an intermediate transfer body is formed from a film-shaped pressing belt that includes a base layer made of a resin such as polyimide or polyamide and contains an appropriate amount of an antistatic agent such as carbon black. The intermediate transfer belt 15 is formed so as to have a volume resistivity of from $10^6$ Ω·cm to $10^{14}$ Ω·cm inclusive, and its thickness is, for example, about 0.1 mm.

The intermediate transfer belt 15 is circulated (rotated) by various rollers in a direction B shown in FIG. 4 at a speed appropriate for its intended use. These rollers include: a driving roller 31 driven by a motor (not shown) having a good constant speed property to rotate the intermediate transfer belt 15; a support roller 32 that supports the intermediate transfer belt 15 extending substantially linearly in the arrangement direction of the photoreceptors 11; a tension applying roller 33 that applies tension to the intermediate transfer belt 15 and serves as a correction roller for preventing meandering of the intermediate transfer belt 15; a back roller 25 disposed in the second transfer unit 20; and a cleaning back roller 34 disposed in a cleaning unit in which the toners remaining on the intermediate transfer belt 15 are scraped off.

Each first transfer unit 10 includes a corresponding first transfer roller 16 facing a corresponding photoreceptor 11 with the intermediate transfer belt 15 therebetween. The first transfer roller 16 includes a core and a sponge layer serving as an elastic layer adhering to the circumference of the core. The core is a cylindrical rod made of a metal such as iron or SUS. The sponge layer is formed of a rubber blend of NBR, SBR, and EPDM with a conducting agent such as carbon black added thereto and is a sponge-like cylindrical roller having a volume resistivity of from $10^{7.5}$ Ω·cm to $10^{8.5}$ Ω·cm inclusive.

The first transfer roller 16 is disposed so as to be pressed against the photoreceptor 11 with the intermediate transfer belt 15 therebetween, and a voltage (first transfer bias) with polarity opposite to the charge polarity of the toner (negative polarity, the same applies to the following) is applied to the first transfer roller 16. Therefore, the toner images on the photoreceptors 11 are electrostatically attracted to the intermediate transfer belt 15 in a sequential manner, and the toner images are superposed on the intermediate transfer belt 15.

The second transfer unit 20 includes the back roller 25 and a second transfer roller 22 disposed on the toner image holding surface side of the intermediate transfer belt 15.

The surface of the back roller 25 is formed from a tube made of a rubber blend of EPDM and NBR with carbon dispersed therein, and the inner portion of the back roller 25 is made of EPDM rubber. The back roller 25 is formed such that its surface resistivity is from $10^7$ Ω/square to $10^{10}$ Ω/square inclusive, and its hardness is set to, for example, 70° (the ASKER C manufactured by Kobunshi Keiki Co., Ltd., the same applies to the following). The back roller 25 is disposed on the back side of the intermediate transfer belt 15 and forms a counter electrode of the second transfer roller 22, and a metallic feeding roller 26 to which a second transfer bias is stably applied is disposed in contact with the back roller 25.

The second transfer roller 22 includes a core and a sponge layer serving as an elastic layer adhering to the circumference of the core. The core is a cylindrical rod made of a metal such as iron or SUS. The sponge layer is formed of a rubber blend of NBR, SBR, and EPDM with a conducting agent such as carbon black added thereto and is a sponge-like cylindrical roller having a volume resistivity of from $10^{7.5}$ Ω·cm to $10^{8.5}$ Ω·cm inclusive.

The second transfer roller 22 is disposed so as to be pressed against the back roller 25 with the intermediate transfer belt 15 therebetween. The second transfer roller 22 is grounded, and the second transfer bias is formed between the second transfer roller 22 and the back roller 25, and the toner images are second-transferred onto a paper sheet K transported to the second transfer unit 20.

An intermediate transfer belt cleaner 35 is disposed downstream of the second transfer unit 20 so as to be separable from the intermediate transfer belt 15. The intermediate transfer belt cleaner 35 removes the toners and paper powder remaining on the intermediate transfer belt 15 after the second transfer to thereby clean the surface of the intermediate transfer belt 15.

The intermediate transfer belt 15, the first transfer units 10 (the first transfer rollers 16), and the second transfer unit 20 (the second transfer roller 22) correspond to examples of the transferring devices.

A reference sensor (home position sensor) 42 that generates a reference signal used as a reference for image formation timings in the image forming units 1Y, 1M, 1C, and 1K is disposed upstream of the yellow image forming unit 1Y. When the reference sensor 42 detects a mark provided on the back side of the intermediate transfer belt 15, the reference sensor 42 generates the reference signal. The controller 40 issues instructions based on the reference signal to start image formation in the image forming units 1Y, 1M, 1C, and 1K.

An image density sensor 43 for image quality adjustment is disposed downstream of the black image forming unit 1K.

The image forming apparatus according to the present exemplary embodiment further includes, as a transport unit that transports a paper sheet K: a paper sheet container 50 that contains paper sheets K; a paper feed roller 51 that picks up and transports the paper sheets K stacked in the paper sheet container 50 one by one at predetermined timing; transport rollers 52 that transport each paper sheet K fed by the paper feed roller 51; a transport guide 53 that feeds the paper sheet K transported by the transport rollers 52 to the second transfer unit 20; a transport belt 55 that transports, to the fixing device 60, the paper sheet K transported after second transfer by the second transfer roller 22; and a fixation entrance guide 56 that guides the paper sheet K to the fixing device 60.

Next, a basic image forming process of the image forming apparatus according to the present exemplary embodiment will be described.

In the image forming apparatus according to the present exemplary embodiment, image data outputted from, for example, an unillustrated image reading device or an unillustrated personal computer (PC) is subjected to image processing in an unillustrated image processing device, and image forming operations are performed in the image forming units 1Y, 1M, 1C, and 1K.

In the image processing device, the inputted reflectance data is subjected to various types of image processing such as shading compensation, misregistration correction, lightness/color space transformation, gamma correction, frame erasure, and various types of image editing such as color editing and move editing. The image data subjected to the image processing is converted to four types of color tone data including Y color data, M color data, C color data, and K color data, and they are outputted to the respective laser exposure units 13.

In each of the laser exposure units 13, the photoreceptor 11 of a corresponding one of the image forming units 1Y, 1M, 1C, and 1K is irradiated with an exposure beam Bm emitted from, for example, a semiconductor laser according to the inputted color tone data. In each of the image forming units 1Y, 1M, 1C, and 1K, the surface of the photoreceptor 11 is charged by the charging unit 12 and is then scanned and exposed using the laser exposure unit 13, and an electrostatic latent image is thereby formed. The formed electrostatic latent images are developed in the respective image forming units 1Y, 1M, 1C, and 1K to thereby form Y, M, C, and K color images.

The toner images formed on the photoreceptors 11 of the image forming units 1Y, 1M, 1C, and 1K are transferred onto the intermediate transfer belt 15 in the first transfer units 10 in which the photoreceptors 11 come into contact with the intermediate transfer belt 15. More specifically, in each of the first transfer units 10, a voltage (first transfer bias) with polarity opposite to the charge polarity (negative polarity) of the toner is applied by the first transfer roller 16 to the base of the intermediate transfer belt 15. The toner images are thereby sequentially superposed onto the surface of the intermediate transfer belt 15, and the first transfer is completed.

After the toner images have been sequentially first-transferred onto the surface of the intermediate transfer belt 15, the intermediate transfer belt 15 moves, and the toner images are transported toward the second transfer unit 20. When the toner images are transported toward the second transfer unit 20, the paper feed roller 51 in the transport unit starts rotating at the timing of transportation of the toner images toward the second transfer unit 20 to feed a paper sheet K of the intended size from the paper sheet container 50. The paper sheet K fed by the paper feed roller 51 is transported by the transport rollers 52 and reaches the second transfer unit 20 through the transport guide 53. Before the paper sheet K reaches the second transfer unit 20, the paper sheet K is temporarily stopped. Then a registration roller (not shown) starts rotating at an appropriate timing determined by the movement of the intermediate transfer belt 15 with the toner images held thereon, and the position of the paper sheet K is thereby aligned with the position of the toner images.

In the second transfer unit 20, the second transfer roller 22 is pressed against the back roller 25 through the intermediate transfer belt 15. In this case, the paper sheet K transported at the appropriate timing is pinched between the intermediate transfer belt 15 and the second transfer roller 22. Then, when a voltage (second transfer bias) with the same polarity as the charge polarity (negative polarity) of the toner is applied from the feeding roller 26, a transfer electric field is formed between the second transfer roller 22 and the back roller 25. All the unfixed toner images held on the intermediate transfer belt 15 are thereby electrostatically transferred at once onto the paper sheet K in the second transfer unit 20 in which the intermediate transfer belt 15 is pressed by the second transfer roller 22 and the back roller 25.

Then the paper sheet K with the toner images electrostatically transferred thereon is released from the intermediate transfer belt 15 and transported by the second transfer roller 22 to the transport belt 55 disposed downstream, with respect to the transfer direction of the paper sheet, of the second transfer roller 22. The transport belt 55 transports the paper sheet K to the fixing device 60 at an optimal transport speed for the fixing device 60. The unfixed toner images on the paper sheet K transported to the fixing device 60 are subjected to fixing processing using heat and pressure by the fixing device 60 and thereby fixed onto the paper sheet K. The paper sheet K with the fixed image formed thereon is transported to an output sheet container (not shown) disposed in an output unit of the image forming apparatus.

After completion of transfer onto the paper sheet K, the toner remaining on the intermediate transfer belt 15 is transported to the cleaning unit by the rotation of the intermediate transfer belt 15 and is removed from the intermediate transfer belt 15 by the cleaning back roller 34 and the intermediate transfer belt cleaner 35.

Although the exemplary embodiments have been described, the present disclosure is not to be construed as being limited to the exemplary embodiments, and various modifications, changes, and improvements are possible.

EXAMPLES

Examples will next be described. However, the present disclosure is not at all limited to these Examples.

Example 1

(Coating Solution Preparing Step)

—Preparation of Coating Solution A—

80 Parts by mass of a polyamic acid solution (TX-HMM (polyimide varnish) manufactured by UNITIKA Ltd., solid content: 18% by mass, solvent: NMP) is added to and mixed with 100 parts by mass of N-methyl-2-pyrrolidone (NMP) to thereby prepare a coating solution A.

—Preparation of Coating Solution B

N-methyl-2-pyrrolidone (NMP) and carbon nanotubes (manufactured by Showa Denko K.K.) are mixed at a mass ratio (NMP:carbon nanotubes) of 80:20 to prepare a dispersion. 445 Parts by mass of a polyamic acid solution (TX-HMM (polyimide varnish) manufactured by UNITIKA Ltd., solid content: 18% by mass, solvent: NMP) is added to and mixed with 100 parts by mass of the dispersion to thereby prepare a coating solution B.

(Belt Forming Step)

—(1)—

The coating solution A is applied to a cylindrical base having a surface roughness Ra of 0.8 μm and dried at 180° C. for 15 minutes to form a coating film A. The amount of the coating solution A applied is adjusted such that the second resin layer after firing has a thickness of 6 μm.

—(2)—

The coating solution B is applied to the coating film A and dried at 180° C. for 15 minutes to form a coating film B. The amount of the coating solution B applied is adjusted such that the first resin layer after firing has a thickness of 72 μm.

—(3)—

The coating film A and the coating film B are fired at 380° C. to thereby form a seamless belt-shaped base layer (a resin belt for an image forming apparatus).

(Formation of Elastic Layer)

Next, a liquid silicone rubber (X34-1053 manufactured by Shin-Etsu Chemical Co., Ltd.) is applied to the outer circumferential surface of the obtained base layer and heated at 110° C. for 15 minutes to thereby obtain an elastic layer having a thickness of 400 μm.

(Formation of Surface Layer)

Next, a fluorocarbon resin tube containing PFA and having a thickness of 30 μm is formed by injection molding, and the inner surface of the tube is treated with liquid ammonia.

The fluorocarbon resin tube is fitted over the elastic layer and heated at 200° C. for 120 minutes to thereby form a surface layer formed from the fluorocarbon resin tube.

A fixing belt is obtained through the above steps.

Example 2

A seamless belt-shaped base layer (a resin belt for an image forming apparatus) and a fixing belt are produced using the same procedure as in Example 1 except that the procedure for preparing the coating solution A is changed as described below, that the content of the filler in the second resin layer is changed to 0.1% by mass, and that the thickness of the second resin layer after firing is changed to 8 μm.

—Preparation of Coating Solution A—

100 Parts by mass of the polyamic acid solution (the same solution as that in Example 1) and 0.018 parts by mass of carbon nanotubes (manufactured by Showa Denko K.K.) are added to and mixed with 100 parts by mass of N-methyl-2-pyrrolidone (NMP) to thereby prepare the coating solution A.

Example 3

A seamless belt-shaped base layer (a resin belt for an image forming apparatus) and a fixing belt are produced using the same procedure as in Example 1 except that, in -(1)- in the (Belt forming step), the amount of the coating solution A applied is changed such that the second resin layer after firing has a thickness of 12 μm and that, in -(2)- in the (Belt forming step), the amount of the coating solution B applied is changed such that the first resin layer after firing has a thickness of 68 μm.

Comparative Example 1

A seamless belt-shaped base layer (a resin belt for an image forming apparatus) and a fixing belt are produced using the same procedure as in Example 1 except that the procedure in the (Belt forming step) is changed to the following procedure.

(Belt Forming Step)

The coating solution B is applied to the cylindrical base, and the coating film is fired at 380° C. to thereby produce a seamless belt-shaped base layer (a resin belt for an image forming apparatus).

Reference Example 1

A desired phosphorus sulfamate electrocasting bath is prepared by adding 500 g/L of nickel sulfamate, 150 mg/L of sodium phosphite, 30 g/L of boric acid, 1.0 g/L of trisodium naphthalene-1,3,6-trisulfonate serving as a primary brightener, and 20 mg/L of 2-butyne-1,4-diol serving a secondary brightener. The electrocasting bath is maintained at 60° C. and a pH of 4.5, and electrocasting is performed at a current density of 16 $A/dm^2$. Specifically, a stainless steel-made cylindrical die is used as the cathode, and depolarized nickel is used as the anode. An electrodeposit is thereby formed on the outer circumferential surface of the die. The electrodeposit is drawn out from the die with the electrodeposit formed thereon to thereby produce a seamless belt-shaped base layer formed of an electrocast nickel-phosphorus alloy and having a thickness of 60 μm.

A fixing belt is produced using the same procedure as in Example 1 except that the above-obtained base layer is used.

Comparative Example 2

The same seamless belt-shaped base layer as that described in an Example of Japanese Unexamined Patent Application Publication No. 2021-063868 is produced.

A fixing belt is produced using the same procedure as in Example 1 except that the above-obtained base layer is used.

Reference Example 2

A seamless belt-shaped base layer (a resin belt for an image forming apparatus) and a fixing belt are produced using the same procedure as in Example 1 except that the procedure in the (Belt forming step) is changed to the following procedure.

(Belt Forming Step)

The coating solution A is applied to the cylindrical base, and the coating film is fired at 380° C. to produce a seamless belt-shaped base layer (a resin belt for an image forming apparatus).

Comparative Example 3

A seamless belt-shaped base layer (a resin belt for an image forming apparatus) and a fixing belt are produced using the same procedure as in Example 1 except that the procedure for preparing the coating solution A is changed to a procedure described below, that the content of the filler in the second resin layer is changed to 0.8% by mass, and that the thickness of the second resin layer after firing is changed to 7 μm.

—Preparation of Coating Solution A—

100 Parts by mass of the polyamic acid solution (the same solution as that in Example 1) and 0.145 parts by mass of carbon nanotubes (manufactured by Showa Denko K.K.) are added to and mixed with 100 parts by mass of N-methyl-2-pyrrolidone (NMP) to thereby prepare the coating solution A.

Example 4

A seamless belt-shaped base layer (a resin belt for an image forming apparatus) and a fixing belt are produced using the same procedure as in Example 1 except that the thickness of the second resin layer after firing is changed to 7 μm and that the composition of the coating solution B is changed to a composition described below.

—Preparation of Coating Solution B—

N-methyl-2-pyrrolidone (NMP) and carbon nanotubes (manufactured by Showa Denko K.K.) are mixed at a mass ratio (NMP:carbon nanotubes) of 98:2 to prepare a dispersion. 445 Parts by mass of the polyamic acid solution (the same solution as that in Example 1) is added to and mixed with 100 parts by mass of the dispersion to thereby prepare the coating solution B.

Example 5

A seamless belt-shaped base layer (a resin belt for an image forming apparatus) and a fixing belt are produced using the same procedure as in Example 4 except that the composition of the coating solution B is changed to a composition described below.

—Preparation of Coating Solution B—

N-methyl-2-pyrrolidone (NMP) and carbon nanotubes (manufactured by Showa Denko K.K.) are mixed at a mass ratio (NMP:carbon nanotubes) of 97.5:2.5 to prepare a dispersion. 445 Parts by mass of the polyamic acid solution (the same solution as that in Example 1) is added to and mixed with 100 parts by mass of the dispersion to thereby prepare the coating solution B.

Example 6

A seamless belt-shaped base layer (a resin belt for an image forming apparatus) and a fixing belt are produced using the same procedure as in Example 4 except that the composition of the coating solution B is changed to a composition described below.

—Preparation of Coating Solution B—

N-methyl-2-pyrrolidone (NMP) and carbon nanotubes (manufactured by Showa Denko K.K.) are mixed at a mass ratio (NMP:carbon nanotubes) of 65.7:34.3 to prepare a dispersion. 445 Parts by mass of the polyamic acid solution (the same solution as that in Example 1) is added to and mixed with 100 parts by mass of the dispersion to thereby prepare the coating solution B.

Example 7

A seamless belt-shaped base layer (a resin belt for an image forming apparatus) and a fixing belt are produced using the same procedure as in Example 4 except that the composition of the coating solution B is changed to a composition described below.

—Preparation of Coating Solution B—

N-methyl-2-pyrrolidone (NMP) and carbon nanotubes (manufactured by Showa Denko K.K.) are mixed at a mass ratio (NMP:carbon nanotubes) of 62.3:37.7 to prepare a dispersion. 445 Parts by mass of the polyamic acid solution (the same solution as that in Example 1) is added to and mixed with 100 parts by mass of the dispersion to thereby prepare the coating solution B.

Example 8

A seamless belt-shaped base layer (a resin belt for an image forming apparatus) and a fixing belt are produced using the same procedure as in Example 2 except that the thickness of the second resin layer after firing is changed to 7 μm.

Comparative Example 4

A seamless belt-shaped base layer (a resin belt for an image forming apparatus) and a fixing belt are produced using the same procedure as in Example 1 except that the procedure for preparing the coating solution A is changed to a procedure described below, that the content of the filler in the second resin layer is changed to 1% by mass, and that the thickness of the second resin layer after firing is changed to 7 μm.

—Preparation of Coating Solution A—

100 Parts by mass of the polyamic acid solution (the same solution as that in Example 1) and 0.18 parts by mass of carbon nanotubes (manufactured by Showa Denko K.K.) are added to and mixed with 100 parts by mass of N-methyl-2-pyrrolidone (NMP) to prepare the coating solution A.

Examples 9 to 11

Seamless belt-shaped base layers (resin belts for an image forming apparatus) and fixing belts are produced using the same procedure as in Example 8 except that the carbon nanotubes contained in the coating solutions A and B are changed to the following fillers.

Example 9: carbon nanotubes having an aspect ratio of 2.5 (manufactured by Showa Denko K.K.)

Example 10: carbon nanotubes having an aspect ratio of 3 (manufactured by Showa Denko K.K.)

Example 11: silicon carbide having an aspect ratio of 100 (manufactured by Haydale Technologies Inc.)

Examples 12 to 15

Seamless belt-shaped base layers (resin belts for an image forming apparatus) and fixing belts are produced using the same procedure as in Example 1 except that the thickness of the second resin layer after firing is changed to 7 μm and that the surface roughness Ra of the cylindrical base to which the coating solution A is applied in the (Belt forming step) is changed as follows.

Example 12: surface roughness Ra: 0.20 μm

Example 13: surface roughness Ra: 0.22 μm

Example 14: surface roughness Ra: 1.6 μm

Example 15: surface roughness Ra: 1.7 μm

<Evaluation>

One of the fixing belts obtained in the above Examples is attached as a heating belt to a fixing device of an image forming apparatus (Versant 3100 Press manufactured by FUJIFILM Business Innovation Corp.), and the following evaluation is performed.

(Fixability Evaluation)

The image forming apparatus is used to output a half-tone fixed image with an image density of 30% continuously on ten A4 paper sheets, and the image quality of the tenth sheet is evaluated by visual inspection.

The evaluation criteria are as follow.

A: The fixed image is not peeled off by scratching with a nail when the thickness of the paper sheet is up to 350 gsm.

B: The fixed image is not peeled off by scratching with a nail when the thickness of the paper sheet is up to 256 gsm.

C: The fixed image is not peeled off by scratching with a nail when the thickness of the paper sheet is up to 204 gsm.

D: The fixed image is peeled off by scratching with a nail when the thickness of the paper sheet is 204 gsm.

(Evaluation of Wearability of Counter Member)

The image forming apparatus is used to output a 10% halftone image continuously on A4 paper sheets. Every time 100000 sheets are outputted, a counter member (a member in contact with the inner circumferential surface of the fixing belt) is detached. A portion of the counter member that was in contact with the fixing belt is observed under a laser microscope (VK-X manufactured by KEYENCE CORPORATION), and the ratio of reduction in the height of irregularities with respect to that of the unused counter member is computed.

The ratio of reduction in the height of irregularities is computed as follows.

The unused counter member is subjected to three-dimensional height measurement. Specifically, the difference in height between a recessed portion and a protruding portion is measured at 5 points, and the average irregularity height is computed. After the continuous output using the image forming apparatus, the counter member is again subjected to the three-dimensional height measurement. The irregularity height is computed in the same manner as that for the unused counter member, and the ratio of reduction in the irregularity height is computed.

The evaluation criteria are as follows.

A: The ratio of reduction in the irregularity height is 20% or less.

B: The ratio of reduction in the irregularity height is more than 20% and 40% or less.

C: The ratio of reduction in the irregularity height is more than 40% and 60% or less.

D: The ratio of reduction in the irregularity height is more than 60%.

(Evaluation of Bending Resistance)

The image forming apparatus is used to output a 10% halftone image continuously on A4 paper sheets. Every time 20000 sheets are outputted, the fixing belt is detached, and the presence of cracking and breakage in the detached fixing belt is checked by visual inspection.

The bending resistance is evaluated according to the following criteria.

A: No cracking and breakage are found in the fixing belt even when the number of outputted sheets reaches 300000.

B: Cracking and breakage are found when the number of outputted sheets is 200000 or more and less than 300000.

C: Cracking and breakage are found when the number of outputted sheets is 100000 or more and less than 200000.

D: Cracking and breakage are found when the number of outputted sheets is less than 100000.

TABLE 1

| | Resin base layer | | | | | | | | |
|---|---|---|---|---|---|---|---|---|---|
| | Second resin layer | | | | First resin layer | | | | Resin layer |
| | Type of filler | Aspect ratio | Filler content (% by mass) | Thickness (μm) | Type of filler | Aspect ratio | Filler content (% by mass) | Thickness (μm) | ratio (second/base) (%) |
| Example 1 | — | — | 0 | 6 | CNT | 15 | 20 | 72 | 8 |
| Example 2 | CNT | 15 | 0.1 | 8 | CNT | 15 | 20 | 72 | 10 |
| Example 3 | — | — | 0 | 12 | CNT | 15 | 20 | 68 | 15 |
| Comparative Example 1 | — | — | — | — | CNT | 15 | 20 | 77 | — |
| Reference Example 1 | — | — | 0 | 7 | Layer formed of electrocast nickel-phosphorus alloy | | | 70 | 9 |
| Comparative Example 2 | CNT | 15 | 5 | 7 | CNT | 15 | 20 | 70 | 9 |
| Reference Example 2 | — | — | — | — | — | — | 0 | 77 | — |
| Comparative Example 3 | CNT | 15 | 0.8 | 7 | CNT | 15 | 20 | 72 | 9 |
| Example 4 | — | — | 0 | 7 | CNT | 15 | 2.4 | 72 | 9 |
| Example 5 | — | — | 0 | 7 | CNT | 15 | 3 | 72 | 9 |
| Example 6 | — | — | 0 | 7 | CNT | 15 | 30 | 72 | 9 |
| Example 7 | — | — | 0 | 7 | CNT | 15 | 32 | 72 | 9 |
| Example 8 | CNT | 15 | 0.1 | 7 | CNT | 15 | 20 | 72 | 9 |
| Comparative Example 4 | CNT | 15 | 1 | 7 | CNT | 15 | 20 | 72 | 9 |
| Example 9 | CNT | 2.5 | 0.1 | 7 | CNT | 2.5 | 20 | 72 | 9 |
| Example 10 | CNT | 3 | 0.1 | 7 | CNT | 3 | 20 | 72 | 9 |
| Example 11 | Silicon carbide | 100 | 0.1 | 7 | Silicon carbide | 100 | 20 | 72 | 9 |
| Example 12 | — | — | 0 | 7 | CNT | 15 | 20 | 72 | 9 |
| Example 13 | — | — | 0 | 7 | CNT | 15 | 20 | 72 | 9 |
| Example 14 | — | — | 0 | 7 | CNT | 15 | 20 | 72 | 9 |
| Example 15 | — | — | 0 | 7 | CNT | 15 | 20 | 72 | 9 |

| | Belt | | | Evaluation | | |
|---|---|---|---|---|---|---|
| | Exposed area of filler on inner circumferential side (%) | Thermal conductivity (W/mK) | Surface roughness Ra of inner circumferential surface (μm) | Fixability | Wearability of counter member | Bending resistance |
| Example 1 | 0 | 1.2 | 0.8 | A | A | A |
| Example 2 | 0.1 | 1.3 | 0.9 | A | B | B |
| Example 3 | 0 | 0.9 | 0.7 | C | A | B |
| Comparative Example 1 | 15 | 1.1 | 1.8 | A | D | C |
| Reference Example 1 | 0 | 1.6 | 0.7 | A | D | D |
| Comparative Example 2 | 5 | 1.5 | 1.6 | A | D | C |
| Reference Example 2 | 0 | 0.3 | 0.6 | D | A | A |
| Comparative Example 3 | 0.8 | 1.4 | 1.3 | A | D | B |
| Example 4 | 0 | 0.4 | 0.7 | D | A | A |
| Example 5 | 0 | 0.5 | 0.8 | C | A | A |
| Example 6 | 0 | 2.2 | 0.9 | A | A | C |

TABLE 1-continued

| | | | | | | |
|---|---|---|---|---|---|---|
| Example 7 | 0 | 2.4 | 1 | A | A | D |
| Example 8 | 0.1 | 1.3 | 1.2 | A | C | B |
| Comparative Example 4 | 1 | 1.5 | 1.3 | A | D | B |
| Example 9 | 0.1 | 0.7 | 0.8 | B | B | B |
| Example 10 | 0.1 | 0.8 | 0.9 | B | B | B |
| Example 11 | 0.1 | 0.9 | 1.2 | B | C | C |
| Example 12 | 0 | 1.2 | 0.18 | A | C | C |
| Example 13 | 0 | 1.2 | 0.2 | A | B | C |
| Example 14 | 0 | 1.2 | 1.5 | A | B | C |
| Example 15 | 0 | 1.2 | 1.6 | A | C | C |

The contents of Table 1 will be described below.

Filler content (% by mass): Each numerical value shown in the first resin layer column represents "the content of the filler in the first resin layer with respect to the total mass of the first resin layer." Each numerical value shown in the second resin layer column represents "the content of the filler in the second resin layer with respect to the total mass of the second resin layer."

Type of filler: CNT represents carbon nanotubes.

Resin layer ratio (second/base) (%): The ratio of the thickness of the second resin layer to the thickness of the resin base layer.

In Table 1, when the resin base layer is a single layer, the type of filler, the aspect ratio, the filler content (% by mass), and the thickness (μm) are shown in the "first resin layer column."

As can be seen from the above results, in each of the resin belts for an image forming apparatus in the Examples, the wear of the member in contact with the inner circumferential surface of the resin belt when the resin belt is driven is small.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A resin belt for an image forming apparatus, the resin belt being in the form of an endless shape, the resin belt comprising:

a resin base layer containing a filler, wherein the resin base layer includes:

a first resin layer in which a content of the filler is from 3% by mass to 30% by mass inclusive; and a second resin layer in which a content of the filler is from 0% by mass to 0.1% by mass inclusive, wherein a thickness of the second resin layer is 15% or less of the thickness of the resin base layer, and wherein an exposed area of the filler on an inner circumferential surface side of the second resin layer is 0.1% or less.

2. The resin belt for an image forming apparatus according to claim 1, wherein a content of filler in the second resin layer is from 0% by mass to 0.05% by mass inclusive.

3. The resin belt for an image forming apparatus according to claim 1, wherein the second resin layer does not contain the filler.

4. The resin belt for an image forming apparatus according to claim 1, wherein the thickness of the second resin layer is 10% or less of the thickness of the resin base layer.

5. The resin belt for an image forming apparatus according to claim 1, wherein the filler has an aspect ratio of 3 or more.

6. The resin belt for an image forming apparatus according to claim 5, wherein the filler having an aspect ratio of 3 or more is carbon nanotubes.

7. The resin belt for an image forming apparatus according to claim 1, wherein the resin belt has a thermal conductivity of 0.8 W/mK or more.

8. The resin belt for an image forming apparatus according to claim 1, wherein a surface roughness Ra on the inner circumferential surface side of the resin base layer is from 0.2 μm to 1.5 μm inclusive.

9. A fixing belt comprising:

the resin belt for an image forming apparatus according to claim 1;

an elastic layer; and a surface layer, the elastic layer and the surface layer being disposed sequentially on the belt.

10. A fixing device comprising:

a first rotatable member; and a second rotatable member disposed in contact with an outer surface of the first rotatable member, wherein at least one of the first rotatable member and the second rotatable member is the fixing belt according to claim 9, and wherein a recording medium with a toner image formed on a surface thereof is caused to pass through a contact portion between the first rotatable member and the second rotatable member to thereby fix the toner image.

11. An image forming apparatus comprising:

an image holding member;

a charging device that charges a surface of the image holding member;

an electrostatic latent image forming device that forms an electrostatic latent image on the charged surface of the image holding member;

a developing device that develops the electrostatic latent image formed on the surface of the image holding member with a developer containing a toner to thereby form a toner image;

a transferring device that transfers the toner image onto a surface of a recording medium; and the fixing device according to claim 10 that fixes the toner image to the recording medium.

12. The resin belt for an image forming apparatus according to claim 2, wherein the thickness of the second resin layer is 10% or less of the thickness of the resin base layer.

13. The resin belt for an image forming apparatus according to claim 3, wherein the thickness of the second resin layer is 10% or less of the thickness of the resin base layer.

14. A resin belt for an image forming apparatus, the resin belt being in the form of an endless shape, the resin belt comprising:

a resin base layer containing a filler, wherein the resin base layer includes:

a first resin layer in which the content of the filler is from 3% by mass to 30% by mass inclusive; and a second resin layer in which the content of the filler is from 0% by mass to 0.1% by mass inclusive, and wherein a thickness of the second resin layer is 15% or less of the thickness of the resin base layer; and an inner circumferential surface side of the second resin layer is an exposed surface.

15. The resin belt for an image forming apparatus according to claim 14, wherein the thickness of the second resin layer is 10% or less of the thickness of the resin base layer.

* * * * *